United States Patent [19]
Tseng

[11] 4,442,993
[45] Apr. 17, 1984

[54] CEILING SUSPENSION DEVICE

[76] Inventor: C. C. Tseng, 167 Ning Hsia Rd., Taipei, Taiwan

[21] Appl. No.: 343,600

[22] Filed: Jan. 28, 1982

[51] Int. Cl.³ .............................................. A47H 1/10
[52] U.S. Cl. .................................... 248/327; 248/412
[58] Field of Search ............... 248/327, 342, 343, 344, 248/333, 335; 52/39, 28; 362/404, 406; 248/412

[56] References Cited
U.S. PATENT DOCUMENTS

| | | | |
|---|---|---|---|
| 389,005 | 9/1888 | Peck | 248/412 |
| 581,136 | 4/1897 | Preece | 248/412 X |
| 909,223 | 1/1909 | Reynolds | 248/412 |
| 1,620,913 | 3/1927 | Orwig | 248/412 X |
| 2,705,119 | 3/1955 | Ingwer | 248/412 X |
| 2,820,888 | 1/1958 | Fekete | 248/343 X |
| 3,022,034 | 2/1962 | Purdy | 248/342 |

*Primary Examiner*—J. Franklin Foss
*Attorney, Agent, or Firm*—Burns, Doane, Swecker & Mathis

[57] ABSTRACT

A ceiling suspension device for rotatably suspending articles such as lighting fixtures and decorative pendants from a ceiling. The suspension device includes an inverted frustoconical housing formed with a conical hole of downwardly decreasing cross section, a plurality of balls received within the housing, a means for evenly spacing the balls apart within the housing, a lengthwise adjustable suspension pole cooperable with the balls for rotatably holding an article, for example, a chandelier, in suspension and for regulating the height of the suspended chandelier, and a releasing means employing a plurality of upstanding arms for releasing the suspension pole from the balls so that easy and quick detachment of the chandelier from the ceiling is accomplished.

2 Claims, 16 Drawing Figures

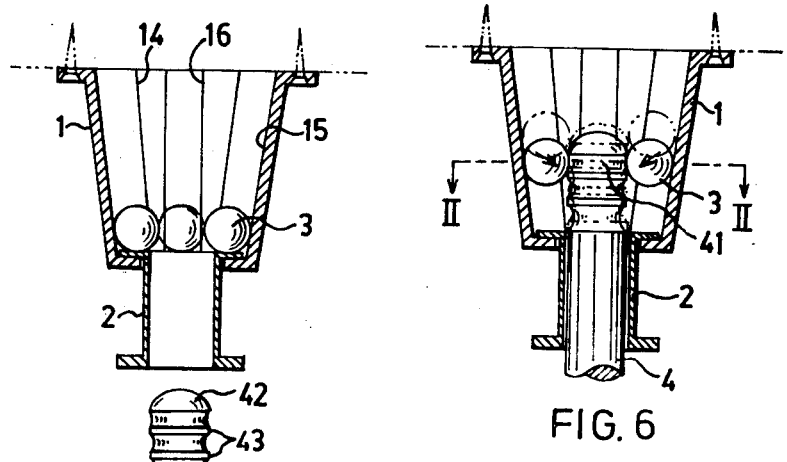
FIG. 6
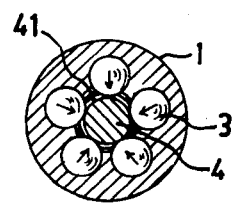
FIG. 7
FIG. 4
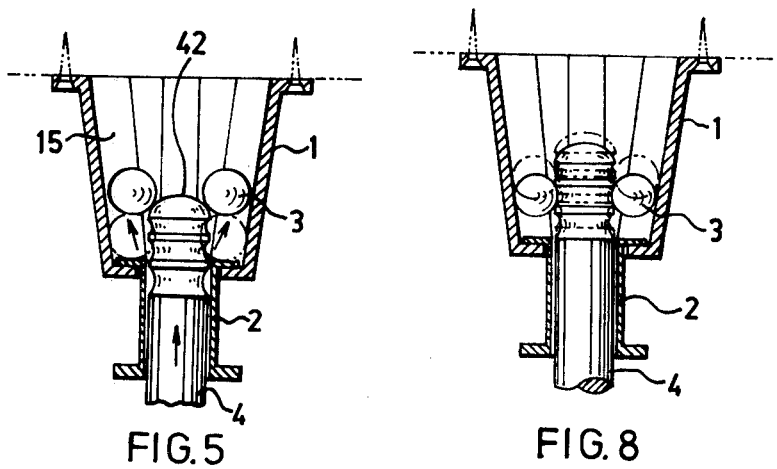
FIG. 5
FIG. 8

(A)　(B)　(C)

CEILING SUSPENSION DEVICE

This invention relates to suspension devices for articles to be suspended from a ceiling, and particularly to a unique ceiling hanging device whereby an article, for example, a chandelier is rotatably suspended from a ceiling while being lengthwise adjustable as well as readily detachable.

Various means for suspending articles such as lighting fixtures and decorative pendants from a ceiling are known. Such articles commonly include a shaft with a hook at the top fastened either to the ceiling or to a chain. In the former case, however, the the suspended article cannot be rotated to a desired position when orientation of the article in a specific direction is preferred. In the latter case, although the suspended article can be rotated within limits to a desired position, the position cannot be maintained since the chain tends to swing. In both cases, the suspended article cannot be lifted or lowered when height adjustment of the article is desired. Moreover, if the article is fixed directly to the ceiling, detachment of the article from the ceiling will be troublesome and yet time-consuming.

The invention is thus intended to overcome the above-mentioned disadvantages.

It is the main object of the invention to provide a ceiling suspension device of simple construction for easily and quickly suspending or detaching articles such as lighting fixtures and decorative pendants from a ceiling.

It is another object of the invention to provide a ceiling suspension device whereby an article, for example, a chandelier, is releasably held in suspension and capable of 360° rotation.

It is still another object of the invention to provide a ceiling suspension device for suspending articles from a ceiling without the use of hooks or chains.

It is a further object of the invention to provide a ceiling suspension device which incorporates a lengthwise adjustable suspension pole for permitting regulation of the height of articles suspended therefrom.

Other objects and features of the invention will become apparent from the following description of preferred embodiments with reference to the accompanying drawings, wherein.

Figures 9, 10, 11:
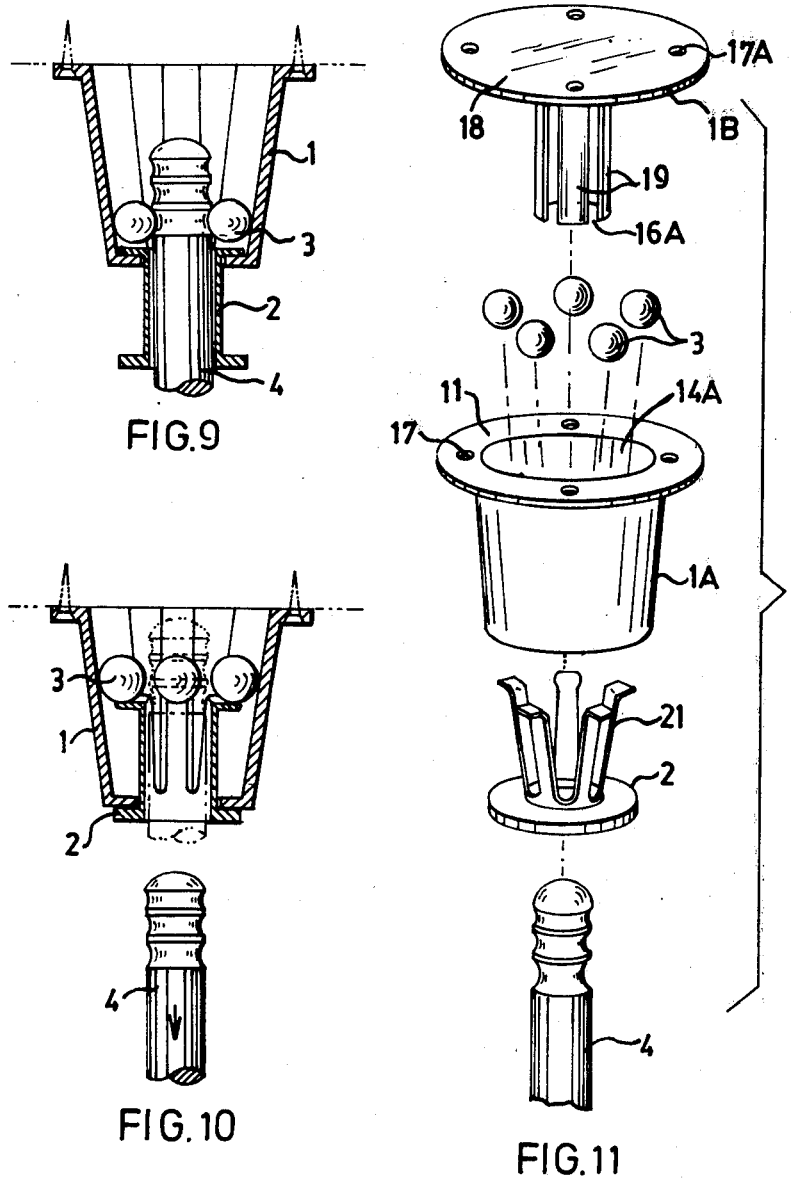
Figure 12:
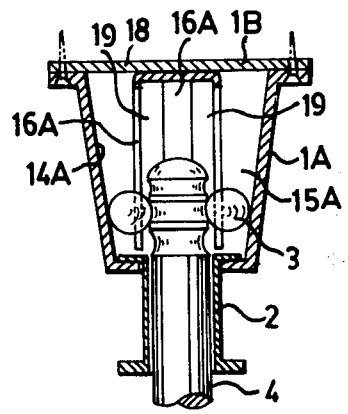
Figure 14:
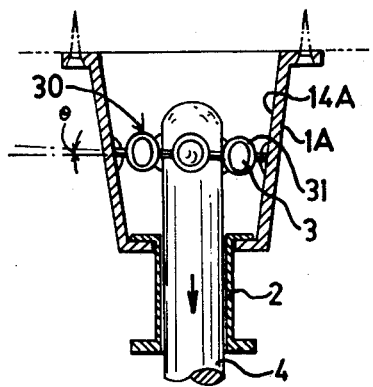
Figure 15:
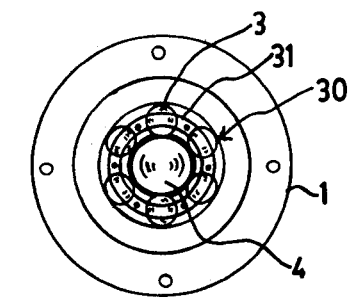
Figure 13:
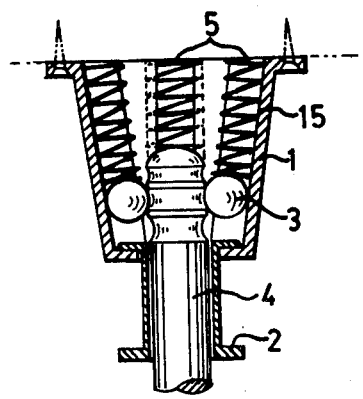

FIGS. 4-10 are diagrams of assistance in explaining the operation of the invention, wherein FIG. 4 shows the suspension pole to be inserted into housing; FIG. 5 shows the suspension pole causing upward and diverging movement of the balls on its upward journey; FIG. 6 shows the balls in engagement with a first circumferential groove on the suspension pole; FIG. 7 is a sectional view on line II-II of FIG. 6; FIG. 8 shows the balls in engagement with a second groove on the suspension pole; FIG. 9 shows the balls in engagement with a third groove on the suspension pole; and FIG. 10 shows the suspension pole being detached from the housing;

FIG. 11 is an exploded perspective view of a second embodiment of the ceiling suspension device according to the invention;

FIG. 12 is a longitudinal sectional view of FIG. 11 showing the ceiling suspension device in assembled condition;

FIG. 13 is a longitudinal sectional view of a third embodiment of the ceiling suspension device according to the invention;

FIG. 14 is a longitudinal section view of a fourth embodiment of the ceiling suspension device according to the invention;

FIG. 15 is a top plan view of the fourth embodiment of FIG. 14; and

FIGS. 16(A)-(c) are perspective views of other preferred embodiments of the suspension pole.

DESCRIPTION OF PREFERRED EMBODIMENTS

Figure 1:
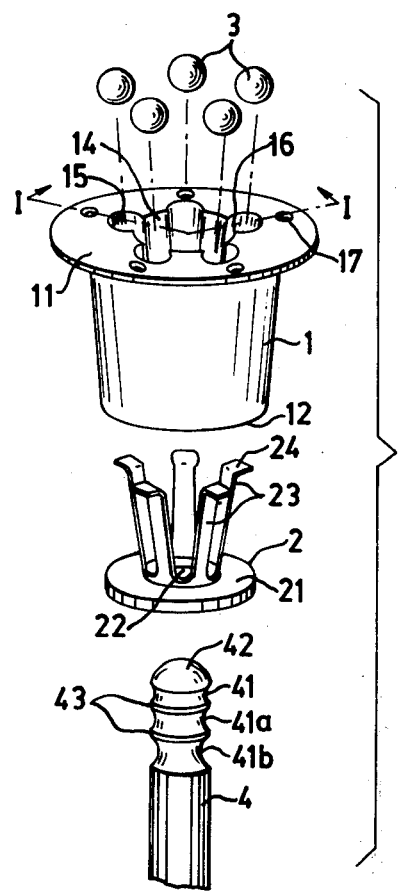
FIG. 1 is an exploded perspective view of a first embodiment of a ceiling suspension device according to the invention showing a housing, a plurality of balls, a releasing means and a suspension pole.
Figure 2:
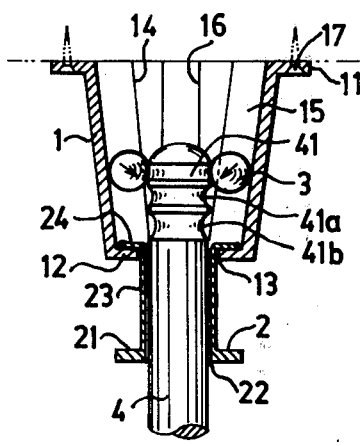
FIG. 2 is a longitudinal sectional view on line I-I of FIG. 1 showing the ceiling suspension device in assembled condition.
Figure 3:
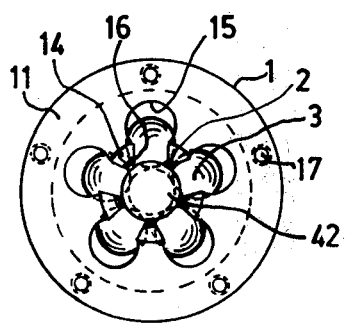
FIG. 3 is a top plan view of the assembled ceiling suspension device shown in FIG. 2.

With reference to FIGS. 1-3, there is illustrated a first embodiment of a ceiling suspension device according to the invention. The ceiling hanging device comprises an inverted frustoconical housing 1, a releasing means 2, a plurality of balls 3 and a suspension pole 4. The releasing means 2, balls 3 and suspension pole 4 may be received by the housing 1, as will be described in detail hereinafter.

The housing 1 is formed with a radial flange 11 around its top end and an opening 13 in its bottom end or base 12, for allowing insertion therein of the releasing means and suspension pole. A centrally defined passage 14 for receiving the suspension pole extends longitudinally of the housing and is tapered in diameter toward the opening 13 in the base 12 thereof. A plurality of identical cavities 15 sized to receive a corresponding plurality of identical balls 3, respectively, are circumferentially and evenly spaced in the vicinity of the tapered passage 14 and extend along the tapered passage from the top end face of the housing toward but not through the base 12. Thus, all cavities are inclined at the same angle with respect to the plane of the base of the housing and closed at the lower end. Further, each cavity is of constant C-shaped cross section, i.e., it is defined by a C-shaped peripheral wall, the opposite edges of which define a substantially rectangular opening or slit 16 through which each cavity communicates with the passage. Each slit 16 has a width less than the diameter of the cavity so that the plurality of balls extend partially through the respective slits when being placed within the respective cavities, as can be seen clearly from FIG. 2. The housing may be fastened to a ceiling by means of screw-type fasteners passing through a plurality of spaced holes 17 formed in the flange 11 on the housing.

The releasing means 2, best illustrated in FIG. 1, is composed of a disc 21 having a concentric circular opening 22 and a plurality of evenly spaced, integral elastic arms 23 which cluster about the circular opening 22 and project upwardly and outwardly from the disc 21. The free end of each elastic arm 23 is bent outwardly to form a tab 24 in parallel with the plane of the disc 21. The arms are equal in number to and shorter in length than the cavities in the housing, and are narrower in width than the slits 16. The opening 13 in the base of the housing is less in diameter than the disc 21 but greater than the opening 22 in the disc. To assemble the releasing means with the housing, the elastic arms 23 of the releasing means may be pressed inwardly against their elasticity so that they converge to take a generally cylindrical form, which permits them to pass through the opening 13 in the base of the housing. When each arm is aligned with a cavity, the tabs 24 will readily extend through the respective slits into the cavities and rest upon the base of the housing upon removal of the pressure applied to the arms. Accordingly, the releasing means is releasably supported by the housing as shown in FIG. 2, while being capable of axial movement relative to the housing.

The suspension pole 4, generally cylindrical in shape, is formed at one end with a hemispherical head portion 42, under which are a plurality of inwardly curved circumferential grooves spaced longitudinally of the suspension pole in a descending order of 41, 41a and 41b by intermediate flanges 43. The grooves may differ in width and depth; for example, an upper groove may be narrower and shallower than the one immediately following it, but the radius of curvature of each groove is the same as the radius of each ball 3 such that each groove is engageable with the balls. The suspension pole is of narrower diameter than the circular opening 22 in the disc so as to be able to pass through the releasing means into the passage 14 in the housing. Preferably, the suspension pole is formed integrally with the article to be suspended, such as a chandelier, to serve as its shaft.

In the embodiment as shown in FIG. 4, the suspension pole is to be inserted through the releasing means into the housing while the balls, slidably received within the respective cavities, are located on the base of housing and extend partially through the slits as previously described. When the suspension pole is inserted through the releasing means into the opening 13 in the base of the housing, the hemispherical head portion 42 of the suspension pole will be brought into tangential contact with the portion of each ball which is exposed in the passage 14, and on its upward journey, causes the balls to move upward in the inclined cavities and diverge from the axis of the suspension pole, as best illustrated in FIG. 5. It is understood that the points of tangential contact between the hemispherical head portion 42 and the balls may describe an imaginary inscribed circle the diameter of which increases with diverging movement of the balls. Therefore, when the diameter of the inscribed circle becomes greater than that of the hemispherical head portion, the balls drop immediately from the positions shown in phantom lines in FIG. 6, converging toward the axis of the suspension pole into the positions in which they are engaged by the upper groove 41. Meanwhile, if the suspension pole is released so that it may drop a little under the effect of gravity, a constricting force which is directly proportional to the weight of the suspended article (not shown) will be produced among the balls encircling the groove 41 thus enabling the balls to multilaterally clamp the suspension pole (see FIG. 7) to hold the article in suspension. It should be appreciated that the suspension pole, though tightly clamped by the balls, is rotatable about its axis on the same principle as ball bearings on shafts.

Advantageously, the suspension length of the suspended article can be regulated by adjusting the suspension pole, and the degree to which the suspension length of the article is regulated varies with the different widths of the respective grooves 41, 41a and 41b. As previously indicated in FIG. 6, the balls are engaged by the groove 41 when the upward movement of the suspension pole is stopped. However, if the suspension pole is kept moving upward, the intermediate flange 43 which separates the groove 41 and 41a will cause the balls to move upward and away from the groove 41. Again, when the diameter of the imaginary inscribed circle described by the points of contact between the balls and the intermediate flange becomes greater than the diameter of the intermediate flange, the balls drop immediately from the positions shown in phantom lines in FIG. 8 and converge toward the axis of the suspension pole into engaging relationship with the groove 41a. By releasing the suspension pole, the balls forming a constricting encirclement around the groove 41a will hold the article in suspension, and the suspension length of the suspended article is thus shortened. If desired, the suspended article may be raised to a higher level by effecting engagement of the balls and the wider groove 41b, as seen from FIG. 9.

As previously explained, the article is suspended because of a constricting force among the balls which is derived from the weight of the article; therefore, the heavier the article is, the tighter the balls clamp the suspension pole. Also, when the balls are engaged by a deeper groove, e.g., the groove 41b, the engaging condition is deeper and more stable. Consequently, the article suspended by the present device will by no means fall off.

The releasing means is provided for detaching the suspension pole from the housing. As shown in FIG. 10, by pushing upward both the suspension pole and the releasing means relative to the housing, the balls will be caused by the tabs 24 of the arms 23 to move upward and away from the groove engaging them. When the suspension pole is moved to the position shown in phantom lines and the upper surface of the disc 21 of the releasing means abuts the base of the housing, the suspension pole and the balls will be out of engagement completely with a clearance being created therebetween, thereby allowing the suspension pole to move independently of the balls. Thus, by retaining the disc 21 in the position as illustrated, the suspension pole can be pulled out of the housing without disturbing the balls. Upon removal of the pressure applied to the disc of the releasing means, the balls drop with the releasing means to the base of the housing under the effect of gravity, while the releasing means is suspended from the housing by means of the tabs resting on the base thereof.

To lower an article suspended on a higher level as shown in FIG. 10, the suspension pole must first be released from the balls by means of the releasing means in the same manner as mentioned hereinbefore and then by inserted back into the housing to effect engagement of the balls with a desired upper groove.

FIG. 11 shows a second embodiment of the ceiling suspension device according to the invention. Since the elements included in this embodiment are, for the most part, similar to those in the first embodiment, the same numerals will be used to denote elements that correspond to those in the first embodiment.

It may be noted in the second embodiment that the suspension device is further provided with a ball restricting means 1B, in addition to a housing 1A, a releasing means 2, a plurality of balls 3 and a suspension pole 4. The ball restricting means 1B comprises a circular cover plate 18 having a diameter exactly the same as the outer diameter of the flange 11 on the housing 1A, a plurality of spaced holes 17A in the circular plate 18, and a plurality of evenly spaced, elongate divider plates 19 positioned centrally of the plate 18 and extending from the undersurface thereof toward the base of the housing 1A (see FIG. 12) to define a generally cylindrical passage for receiving the suspension pole 4. Similar to the slits 16 defined by the opposite wall edges of the cavities 15 in the first embodiment, a plurality of slits 16A are each defined by adjacent divider plates 19 of the ball restricting means.

It also may be noted that the ball receiving cavities 15 found in the housing 1 are conspicuously absent from the housing 1A. Instead, the inverted frustoconical housing 1A is open at the top end and formed with a similarly shaped or downwardly tapered bore 14A, which is bigger than the passage 14 in the housing 1 to accommodate the balls 3 and the divider plates 19 of the ball restricting means. The holes 17A in the cover plate 18 of the ball restricting means correspond to the holes 17 in the flange 11 on the housing 1A and may be disposed in alignment therewith when the ball restricting means is laid over the housing 1A. Thus, the ball restricting means and the housing 1A can be fastened to a ceiling by means of screw-type fasteners passing through the holes 17 and 17A into the ceiling.

The divider plates 19 of the ball restricting means and the inclined inner wall surface of the housing 1A cooperate to provide a chamber 15A in the bore 14A for receiving the balls and to prevent the same from being dislodged. As shown in FIG. 12, the balls are evenly spaced apart in the chamber 15A by the divider plates while extending partially through the respective slits 16A. Thus, movement of the balls is kept within limits by the divider plates and the inclined inner wall surface of the housing 1A. Therefore, by inserting the suspension pole 4 through the releasing means 2 into the opening 13 in the base of the housing 1A to cause first diverging and then converging movement of the balls with respect to the axis of the suspension pole, the balls will be engaged by one of grooves on the suspension pole, and the suspension pole will be rotatably held in suspension by virture of the constricting encirclement of the balls when it is released. Height adjustment as well as detachment of the suspension pole can be accomplished in the same as described hereinbefore on the first embodiment.

A third embodiment of the ceiling suspension device is illustrated in FIG. 13, wherein the embodiment has the same structure as the first embodiment shown in FIGS. 1–10 except that it further includes a plurality of compression springs 5 received within the respective cavities 15. Each compression spring 5 reacts at one end against the ceiling and at the other end against the ball such that the balls are constantly biased toward the base of the housing 1. Since upward and diverging movement of the balls are obstructed by the springs (except when pressure is exerted on the balls against the resistance of the springs), the suspension device can not only be fixed vertically to a ceiling but be fixed in a horizontal position to vertical walls of a room.

FIG. 14 shows another modified embodiment, or a fourth embodiment, of the invention. As shown, the suspension device includes a housing 1A identical to the housing 1A shown in FIG. 12 and an annular ball retainer 30 which is composed of an annular separator 31 and a plurality of balls 3 held and evenly spaced by the separator 30. The ball retainer 30 is slidably supported in the bore 14A of the housing 1A by means of the balls disposed in circumferential contact with the inclined inner wall surface of the housing. In this embodiment, however, a suspension pole without any grooves (see FIG. 16) is used for cooperation with the ball retainer. The inner diameter of the annular ball retainer is slightly greater than the diameter of the suspension pole 4 so that the suspension pole may fit in.

To hold the suspension pole in suspension, the suspension pole must first be manipulated so that the ball retainer is inclined with respect to the circular plane of the housing base at an angle indicated by θ. The angular displacement of the ball retainer then results in friction between the balls and the suspension pole as well as between the balls and the inclined inner wall surface of the housing. Consequently, under the effect of such friction the suspension pole is suspended from the housing.

Figure 16:
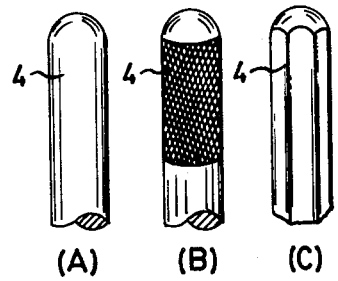

FIG. 16 shows other preferred embodiments of the suspension pole of the invention. FIG. 16A shows a cylindrical suspension pole with a smooth outer surface. FIG. 16B shows another cylinderical suspension pole the outer periphery of which is reticulated adjacent its upper end portion to form a friction surface. FIG. 16C shows a polygonal shaped suspension pole. Although these types of suspension poles are different from the groove-type suspension pole, they accomplish the same job as the latter.

It will be seen from the foregoing that the invention provides a novel suspension device particularly suitable for suspending articles such as lighting fixtures and decorative pendants from a ceiling. The device employs a suspension pole which may be integrally formed with the article to be suspended and a plurality of balls adapted to multilaterally clamp the suspension pole for releasably holding the article. Since the suspension pole is lengthwise adjustable, height adjustment of the suspended article can be achieved easily without the need to alter the article. Further, the use of a grooved suspension pole is of particular advantage where the article is relatively heavy, since engagement of the balls and a deeper and wider groove imparts greater loadbearing ability to the suspension pole. Also, that the suspension pole is capable of 360-degree rotation is of great advantage where orientation of the suspended article in a specific direction is desired.

Moreover, the suspended article can be easily and quickly detached by only pushing upward both the releasing means and the suspension pole. And when necessary, this suspension device may include compression springs to allow the article to be horizontally supported.

As many apparently widely different embodiments of this invention may be made without departing from the spirit and scope thereof, it is to be understood that the invention is not limited to the specific embodiments thereof except as defined in the appended claims.

I claim:

1. A ceiling suspension device comprising a hollow inverted frustoconical housing having an externally flanged open-ended top and a base with a circular center opening for insertion therein of a suspension pole, a centrally defined passage of decreasing cross section from the top opening of the housing to the circular center opening in the base thereof, a releasing means including a disc having a concentric circular opening and a plurality of evenly spaced, integral elastic arms clustering about the circular opening in the disc and projecting upwardly and outwardly therefrom with the free end of each arm being bent outwardly to form a tab parallel to the disc, said elastic arms being adapted to be inserted through the opening in the base of the housing to be suspended from the housing by means of the tabs resting on the base thereof and being capable of axial movement relative to the housing; a plurality of balls adapted to be received within the housing; and a suspension pole adapted to be inserted through the circular opening in the disc of the releasing means into the passage in the housing, said suspension pole having means for causing converging or diverging movement of the balls for causing multilateral clamping or loosening action of the balls, and a ball restricting means including a circular cover plate having a diameter exactly the same as the outer diameter of the flange of the housing, a plurality of evenly spaced, elongate divider plates positioned centrally of the cover plate and extending from the undersurface thereof toward the base of the housing to define a generally cylindrical passage for receiving the suspension pole, a plurality of slits each being defined between adjacent divider plates, and a ball receiving chamber which is defined between the cylindrical passage and the inner periphery of the housing when the ball restricting means is laid over the housing, said chamber and cylindrical passage communicating through the slits such that the balls received in the chamber are evenly spaced apart by the divider plates and extend partially through tne respective slits.

2. A ceiling suspension device as defined in claim 1, wherein said cylindrical passage formed by the divider plates has an inner diameter slightly greater than the diameter of the suspension pole.

* * * * *